United States Patent
Guo

(10) Patent No.: US 9,325,736 B2
(45) Date of Patent: Apr. 26, 2016

(54) METHOD AND DEVICE FOR ANTI-VIRUS SCANNING

(71) Applicant: Tencent Technology (Shenzhen) Company Limited, Guangdong (CN)

(72) Inventor: Yibin Guo, Guangdong (CN)

(73) Assignee: Tencent Technology (Shenzhen) Company Limited, SEG Park, Zhenxing Road, Futian District Shenzhen, Guangdong (CN)

(*) Notice: Subject to any disclaimer, the term of this patent is extended or adjusted under 35 U.S.C. 154(b) by 0 days.

(21) Appl. No.: 14/419,275

(22) PCT Filed: Nov. 14, 2013

(86) PCT No.: PCT/CN2013/087166
§ 371 (c)(1),
(2) Date: Feb. 3, 2015

(87) PCT Pub. No.: WO2014/107991
PCT Pub. Date: Jul. 17, 2014

(65) Prior Publication Data
US 2015/0207807 A1 Jul. 23, 2015

(30) Foreign Application Priority Data

Jan. 10, 2013 (CN) .......................... 2013 1 0008632

(51) Int. Cl.
| G06F 21/00 | (2013.01) |
| H04L 29/06 | (2006.01) |
| G06F 21/56 | (2013.01) |
| G06F 12/08 | (2016.01) |

(52) U.S. Cl.
CPC .......... *H04L 63/145* (2013.01); *G06F 12/0868* (2013.01); *G06F 21/56* (2013.01); *G06F 21/562* (2013.01); *G06F 2212/314* (2013.01); *G06F 2212/463* (2013.01)

(58) Field of Classification Search
CPC . H04L 63/145; G06F 12/0868; G06F 21/562; G06F 21/56; G06F 2212/314; G06F 2212/463
See application file for complete search history.

(56) References Cited

U.S. PATENT DOCUMENTS

| 7,591,019 | B1 * | 9/2009 | Sobko | G06F 21/564 |
| | | | | 707/999.002 |
| 8,856,927 | B1 * | 10/2014 | Beloussov | G06F 21/53 |
| | | | | 726/23 |
| 2006/0185016 | A1 * | 8/2006 | Sitze | G06F 21/562 |
| | | | | 726/24 |
| 2013/0055396 | A1 * | 2/2013 | Wang | G06F 21/53 |
| | | | | 726/24 |

* cited by examiner

*Primary Examiner* — Lisa Lewis
(74) *Attorney, Agent, or Firm* — Frommer Lawrence & Haug LLP; William S. Frommer

(57) ABSTRACT

A method for anti-virus scanning is described, including: when performing an anti-virus operation on at least one file in a disk, recording information of the at least one file and information of a disk section having a read/write operation during the anti-virus scan operation; analyzing the information of the at least one file and the information of the disk section having the read/write operation during the anti-virus scan operation, and obtaining a cache reference section; loading one or more files in the cache reference section into a memory, and reading the loaded one or more files in the memory to scan when receiving an anti-virus scan request. Further, a device for anti-virus scanning is also described. In the method and the device, the amount of disk read/write operations during the anti-virus scan can be decreased, and the efficiency of anti-virus scanning can be improved.

16 Claims, 6 Drawing Sheets

METHOD AND DEVICE FOR ANTI-VIRUS SCANNING

CROSS REFERENCE TO RELATED APPLICATIONS

This present application claims the benefit of priority to China Patent Application No. 201310008632.8, filed on Jan. 10, 2013, the contents of which are incorporated by reference herein in their entirety for all intended purposes.

FIELD OF THE TECHNOLOGY

The disclosure relates to the field of internet technology, and particularly to a method and a device for anti-virus scanning.

BACKGROUND

As the development and the popularization of the internet, more and more users start to experience the internet. However, not all the environments and the resources of the internet could be secured. If a user terminal is infected by a virus, it may cause terminal system paralysis or hardware damage, even cause the user privacy information leakage to threaten the personal and property safety. Thus, the problem of internet security is increasingly concerned by people. A conventional method of anti-virus includes two parts which are static defense and dynamic defense, and these two parts are the cornerstones for confronting the spread of virus. The static defense therein is an even more fundamental technique in anti-virus process, and some basic functions of dynamic defense also need to be provided and strengthened by the static defense. Moreover, in the static defense, the performance of anti-virus engine is most important. There are several measuring indices for the performance of anti-virus engine, such as virus detection rate, virus killing rate, efficiency of anti-virus scanning, etc., while one of the critical measuring indices is the efficiency of anti-virus scanning. When performing an anti-virus scanning, the anti-virus engine needs to consider both of disk read/write operations and calculations. Therefore, in a conventional anti-virus engine, the disk read/write operation as a key factor for the efficiency of anti-virus scanning becomes the bottleneck of the conventional anti-virus engine performance.

In a conventional anti-virus method, by caching a to-be-scanned file into a memory and scanning the to-be-scanned file in the memory, the amount of disk read/write operations in a subsequent anti-virus scanning is reduced, and thus, the efficiency of anti-virus scanning is improved. Due to the limited capacity of a memory, this method usually caches only virus files into a memory, while for the huge amount of normal files on a user terminal, there is no definite method to instruct whether and which files need to be cached into the memory. Therefore, the conventional anti-virus method consumes such a long time, and the efficiency of anti-virus scanning is low.

SUMMARY

Exemplary embodiments of the present invention provide a method and a device for anti-virus scanning, which can reduce the amount of disk read/write operations during the anti-virus scanning and improve the efficiency of anti-virus scanning.

One embodiment of the present invention provides a method for anti-virus scanning, comprising: when performing an anti-virus scan operation on at least one file in a disk, recording information of the at least one file and information of a disk section having a read/write operation during the anti-virus scan operation; analyzing the information of the at least one file and the information of the disk section having the read/write operation during the anti-virus scan operation, and obtaining a cache reference section; loading one or more files in the cache reference section into a memory, and reading the loaded one or more files in the memory to scan when receiving an anti-virus scan request.

Another embodiment of the present invention provides a device for anti-virus scanning, comprising: an anti-virus scanning unit, which is configured to perform an anti-virus scan operation on at least one file in a disk; a recording unit, which is configured to when performing an anti-virus scan operation on at least one file in a disk, record information of the at least one file and information of a disk section having a read/write operation during the anti-virus scan operation; a processing unit, which is configured to analyze the information of the at least one file and the information of the disk section having the read/write operation during the anti-virus scan operation and obtain a cache reference section; and a caching unit, which is configured to load one or more files in the cache reference section into a memory, and indicate the anti-virus scanning unit to read the loaded one or more files from the memory to scan when the anti-virus scanning unit receives an anti-virus scan request.

Exemplary embodiments of the present invention may have the following benefit effects.

A cache reference section can be obtained by recording and analyzing information of at least one file and information of a disk section having a read/write operation during an anti-virus scan operation on the at least one file. So, when scanning next time, one or more files in the cache reference section can be pre-loaded into a memory. Thus, cache data can be identified, and the efficiency of anti-virus scanning can be improved. By classifying files to select proper cache files according to file popularity, a reading attribute of anti-virus engine, and unhitted cache data reported by a terminal, the range of cache reference section can be compressed, and the hit rate of cache files can be raised. Moreover, by judging whether the file capacity of cache reference section is appropriate so as to compress the cache reference section repeatedly, the memory storage pressure can be reduced, and the efficiency of anti-virus scanning can be increased without affecting the process performance. When a cache file is unhitted, the section corresponding to the unhitted cache file may be combined into the cache reference section. Therefore, the cache reference section can be further improved, and the hit rate of cache files can be enhanced.

BRIEF DESCRIPTION OF THE DRAWINGS

In order to illustrate the embodiments or existing technical solutions more clearly, a brief description of drawings that assists the description of embodiments of the invention or existing art will be provided below. It would be apparent that the drawings in the following description are only for some of the embodiments of the invention. A person having ordinary skills in the art will be able to obtain other drawings on the basis of these drawings without paying any creative work.

DETAILED DESCRIPTION OF ILLUSTRATED EMBODIMENTS

Technical solutions in embodiments of the present invention will be illustrated clearly and entirely with the aid of the drawings in the embodiments of the invention. It is apparent that the illustrated embodiments are only some embodiments of the invention instead of all of them. Other embodiments that a person having ordinary skills in the art obtains based on the illustrated embodiments of the invention without paying any creative work should all be within the protection scope sought by the present invention.

Figure 1:
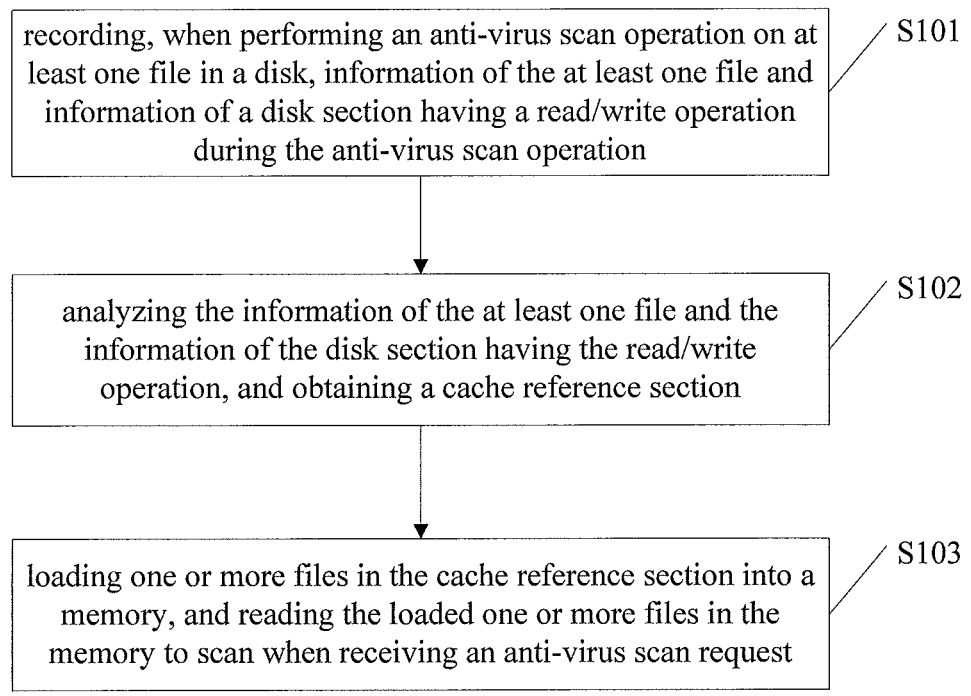
FIG. 1 is a flowchart of a method for anti-virus scanning according to one embodiment of the invention.

Referring to FIG. 1, it is a flowchart of a method for anti-virus scanning according to one embodiment of the invention. The method comprises the following steps.

Step S101 is: when performing an anti-virus scan operation on at least one file in a disk, recording information of the at least one file and information of a disk section having a read/write operation during the anti-virus scan operation.

Specifically, information of each of the at least one file comprises: a file type, and a hash data of the file; wherein, the file type is used to classify files and perform statistic on disk sections having read/write operations for files of respective types; and the hash data of the file is used to check correction and integration of the file.

It is obvious that information of each of the at least one file can further comprise but not limited to other information of file attributes, such as the version number, shelled or unshelled, compressed or uncompressed, etc.

Step S102 is: analyzing the information of the at least one file and the information of the disk section having the read/write operation, and obtaining a cache reference section.

Step S103 is: loading one or more files in the cache reference section into a memory, and reading the loaded one or more files in the memory to scan when receiving an anti-virus scan request.

By recording and analyzing information of the at least one file and information of disk section having a read/write operation during scanning the at least one file, a cache reference section is obtained. So, when scanning next time, the at least one file in the cache reference section can be pre-loaded into a memory. Thus, cache data can be identified, and the efficiency of anti-virus scanning can be improved.

Figure 2:
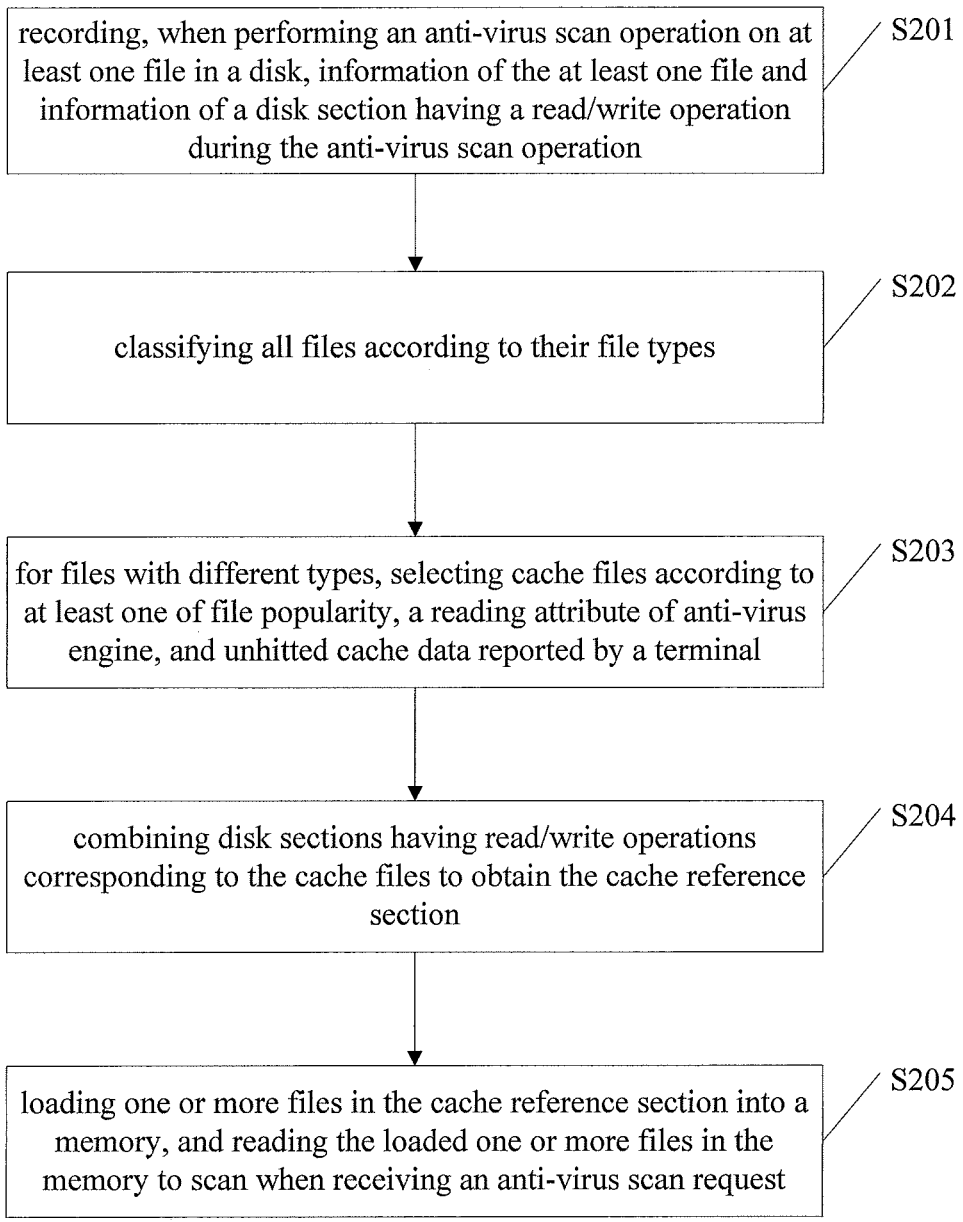
FIG. 2 is a flowchart of a method for anti-virus scanning according to another embodiment of the invention.

Referring to FIG. 2, it is a flowchart of a method for anti-virus scanning according to another embodiment of the invention. The method comprises the following steps.

Step S201 is: recording, when performing an anti-virus scan operation on at least one file in a disk, information of the at least one file and information of a disk section having a read/write operation.

Step S202 is: classifying all files according to their file types.

Generally, for files of different types, disk sections that have read/write operations are normally different. For example, the disk section having a read/write operation for a picture file apparently differs from the one for a compressed file. If performing the same operation on files of different types, it would affect the correction of subsequent analysis and calculations on the cache reference section.

Step S203 is: for files of different types, selecting cache files according to at least one of file popularity, a reading attribute of anti-virus engine, and unhitted cache data reported by a terminal.

Specifically, the file popularity is high when a file is frequently used, and the file popularity is low when a file is rarely used. For a file with high file popularity, its corresponding disk section having read/write operations usually needs to be preferentially considered, while for a file with low file popularity, it may not be necessary to be added into cache. Particularly, when there is confliction between the disk section having a read/write operation of high-popularity file and the one of low-popularity file, the high-popularity file should have priority to be admissible. Generally, a popularity threshold may be preset to indicate the frequency of use for a file in a preset duration. When its file popularity reaches the popularity threshold, a file will be judged as a high-popularity file.

The reading attribute of an anti-virus engine may be frequencies of the anti-virus engine reading respective sections of the disk. For example, some anti-virus engine will frequently read a certain section in a disk, and thus, the data in this section can be added into the cache reference section.

For the data not included in the cache reference section, its corresponding section can also be added into the cache reference section when reported by a terminal.

After screened by one or more of the screening criteria described above, a series of disk sections having read/write operations can be obtained.

Step S204 is: combining disk sections having read/write operations corresponding to the cache files to obtain the cache reference section.

Step S205 is: loading one or more files in the cache reference section into a memory, and reading the loaded one or more files in the memory to scan when receiving an anti-virus scan request.

By the analyzing method described above in one embodiment, disk sections having read/write operations corresponding to frequently used files can be obtained. A cache reference section obtained by combining these sections can have a relatively high hit rate. As a result, the efficiency of anti-virus scanning can be relatively improved while the storage pressure of memory can be decreased.

Figure 3:
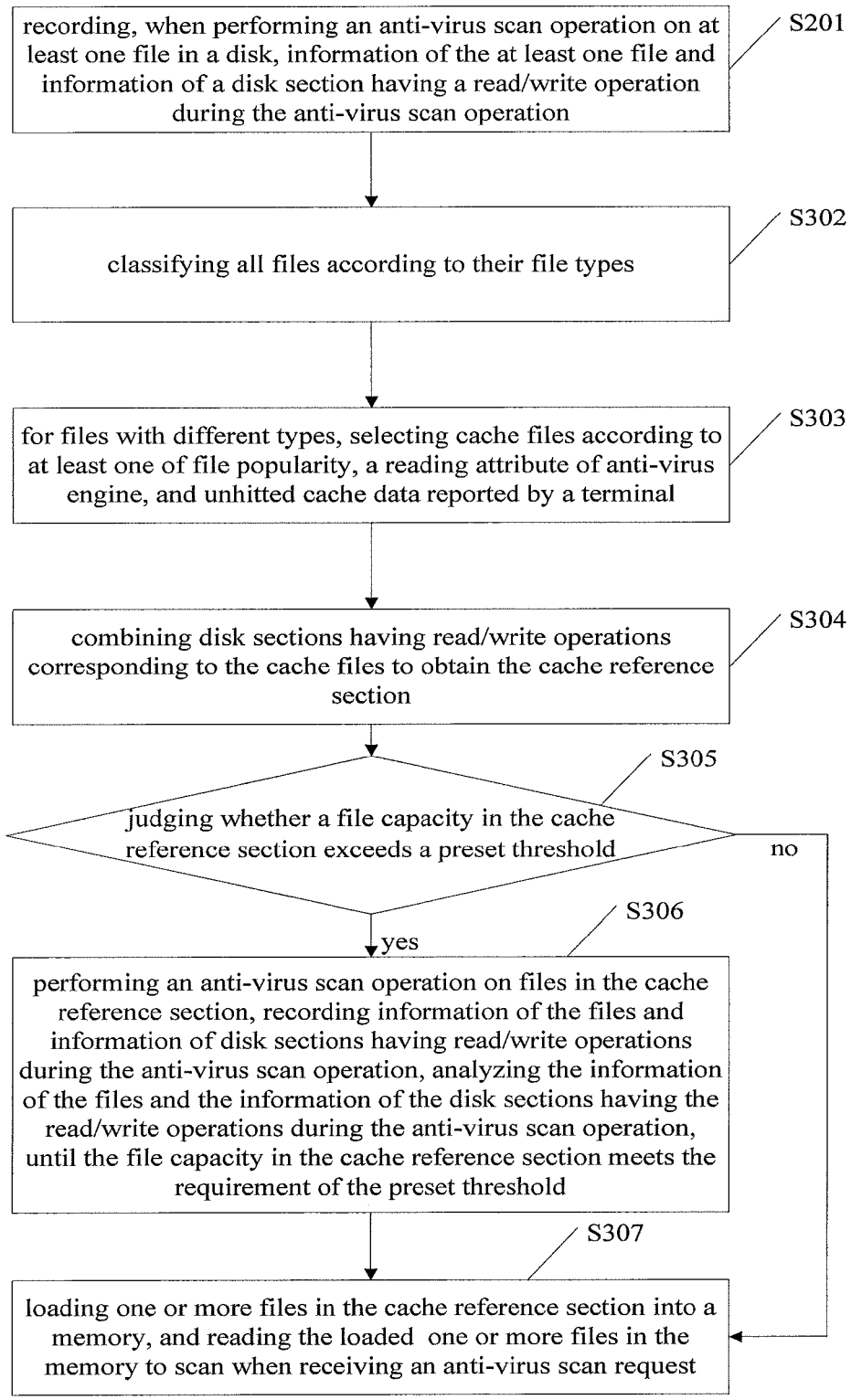
FIG. 3 is a flowchart of a method for anti-virus scanning according to yet another embodiment of the invention.

Referring to FIG. 3, it is a flowchart of a method for anti-virus scanning according to yet another embodiment of the invention. The method comprises the following steps.

Step S301 is: recording, when performing an anti-virus scan operation on at least one file in a disk, information of the at least one file and information of a disk section having a read/write operation.

Step S302 is: classifying all files according to their file types.

Step S303 is: for files with different types, selecting cache files according to at least one of file popularity, a reading attribute of anti-virus engine, and unhitted cache data reported by a terminal.

Step S304 is: combining disk sections having read/write operations corresponding to the cache files to obtain the cache reference section.

Step S305 is: judging whether a file capacity in the cache reference section exceeds a preset threshold.

Generally, the storage capacity of a memory is limited. If too many files are cached, the performance of processing unit would be decreased, and thus processing fluency of the anti-virus scanning would be influenced. Therefore, it is very important for efficiency control of anti-virus scanning to introduce reasonable judgment mechanism to control the size of cache reference section.

Step S306 is: performing an anti-virus scan operation on files in the cache reference section, recording information of the files and information of disk sections having read/write operations during the anti-virus scan operation, analyzing the information of the files and the information of the disk sections having the read/write operations during the anti-virus scan operation, until the file capacity in the cache reference section meets the requirement of the preset threshold.

Herein, a method for further compressing the cache reference section is provided. By performing continuous cycle of scanning, recording, and analyzing on the files in the cache reference section, a more appropriate cache reference section can be obtained, until the file capacity in the cache reference section meets the requirement of a preset threshold. In this way, the efficiency of anti-virus scanning can be improved without influencing the whole performance of system.

Step S307 is: loading one or more files in the cache reference section into a memory, and reading the loaded one or more files in the memory to scan when receiving an anti-virus scan request.

Figure 4:
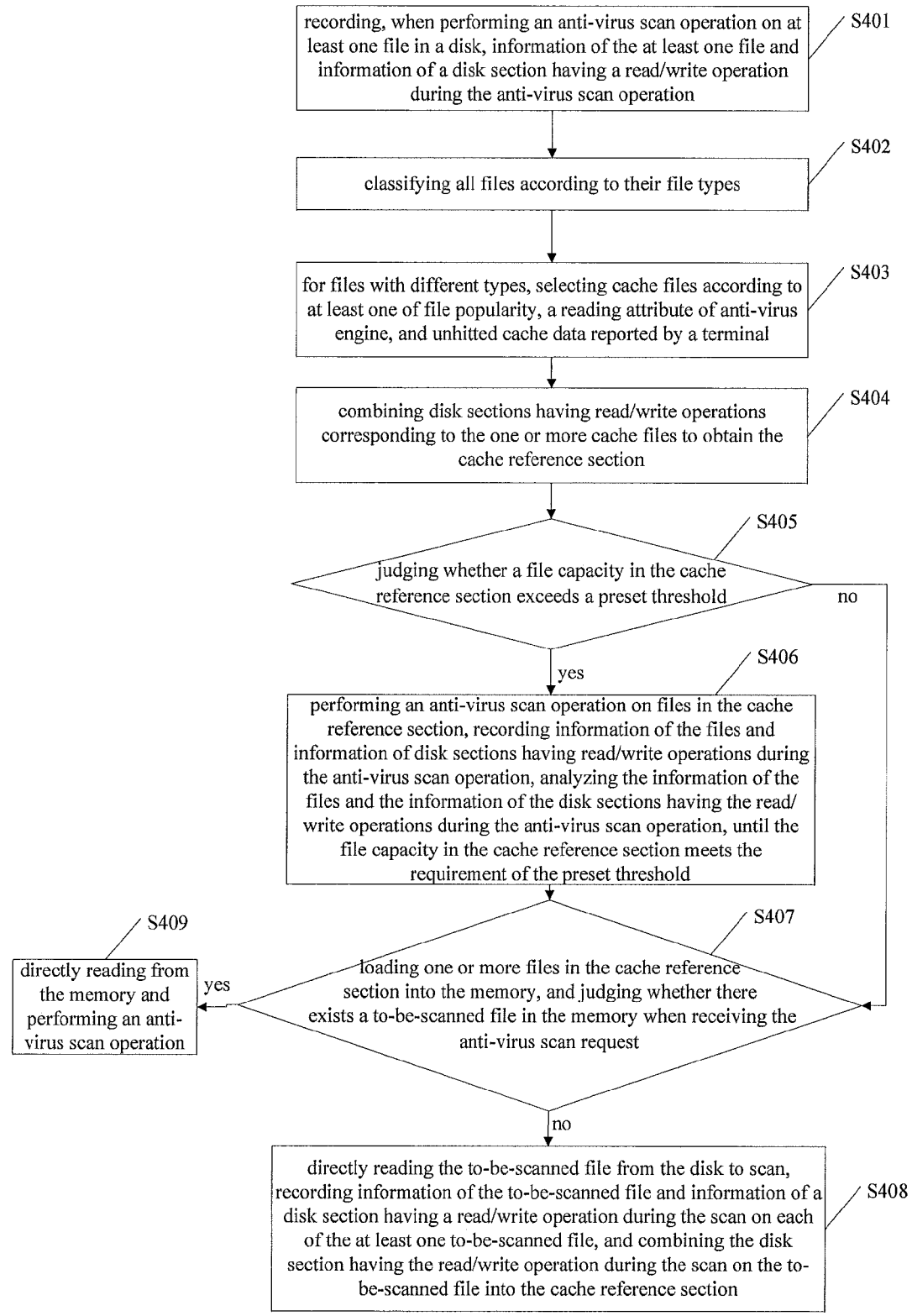
FIG. 4 is a flowchart of a method for anti-virus scanning according to yet another embodiment of the invention.

Referring to FIG. 4, it is a flowchart of a method for anti-virus scanning according to yet another embodiment of the invention. The method comprises the following steps.

Step S401 is: recording, when performing an anti-virus scan operation on at least one file in a disk, information of the at least one file and information of a disk section having a read/write operation.

Step S402 is: classifying all files according to their file types.

Step S403 is: for files with different types, selecting cache files according to at least one of file popularity, a reading attribute of anti-virus engine, and unhitted cache data reported by a terminal.

Step S404 is: combining disk sections having read/write operations corresponding to the cache files to obtain the cache reference section.

Step S405 is: judging whether a file capacity in the cache reference section exceeds a preset threshold.

Step S406 is: performing an anti-virus scan operation on files in the cache reference section, recording information of the files and information of disk sections having read/write operations during the anti-virus scan operation, analyzing the information of the files and the information of the disk sections having the read/write operations during the anti-virus scan operation, until the file capacity in the cache reference section meets the requirement of the preset threshold.

Step 407 is: loading one or more files in the cache reference section into the memory, and judging whether there exists a to-be-scanned file in the memory when receiving the anti-virus scan request.

Step 408 is: reading the to-be-scanned file directly from the disk to scan, recording information of the to-be-scanned file and information of a disk section having a read/write operation during the scan on the to-be-scanned file, and combining the disk section having the read/write operation during the scan on the to-be-scanned file into the cache reference section.

The hit rate is greatly improved by the method described before, however, it still cannot exclude that there exists unhitted files in the cache reference section. Accordingly, the cache reference section can be further improved by judging whether there exists a to-be-scanned file; if there exists no to-be-scanned files, reading the to-be-scanned file directly from the disk and performing an anti-virus scan operation, and meanwhile, introducing a parallel adding manner to combine the disk section having a read/write operation which corresponds to the unhitted file into the cache reference section. If the file capacity in the cache reference section exceeds the preset threshold, some rarely used files in the cache reference section may be deleted according to the file type, the file popularity, and the reading attributes of anti-virus engine as references, so as to keep the section size appropriate.

Step S409 is: reading directly from the memory and performing an anti-virus scan operation.

Figure 5:
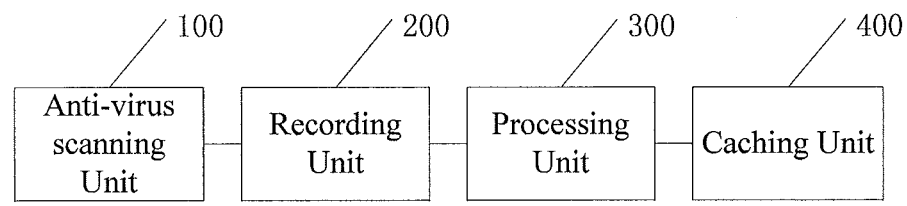
FIG. 5 is a structure diagram of a device for anti-virus scanning according to yet another embodiment of the invention.

Referring to FIG. 5, it is a structure diagram of a device for anti-virus scanning according to yet another embodiment of the invention. The device comprises: an anti-virus scanning unit 100, a recording unit 200, a processing unit 300 and a caching unit 400.

The anti-virus scanning unit 100 is configured to perform an anti-virus scan operation on at least one file in a disk; the recording unit 200 is configured to when the anti-virus scanning unit 100 performs an anti-virus scan operation on at least one file in a disk, record information of the at least one file and information of a disk section having a read/write operation during the anti-virus scan operation; the processing unit 300 is configured to analyze the information of the at least one file and the information of the disk section having the read/write operation and obtain a cache reference section; and the caching unit 400 is configured to load one or more files in the cache reference section into a memory, and read the loaded one or more files in the memory to scan when receiving an anti-virus scan request.

Figure 6:
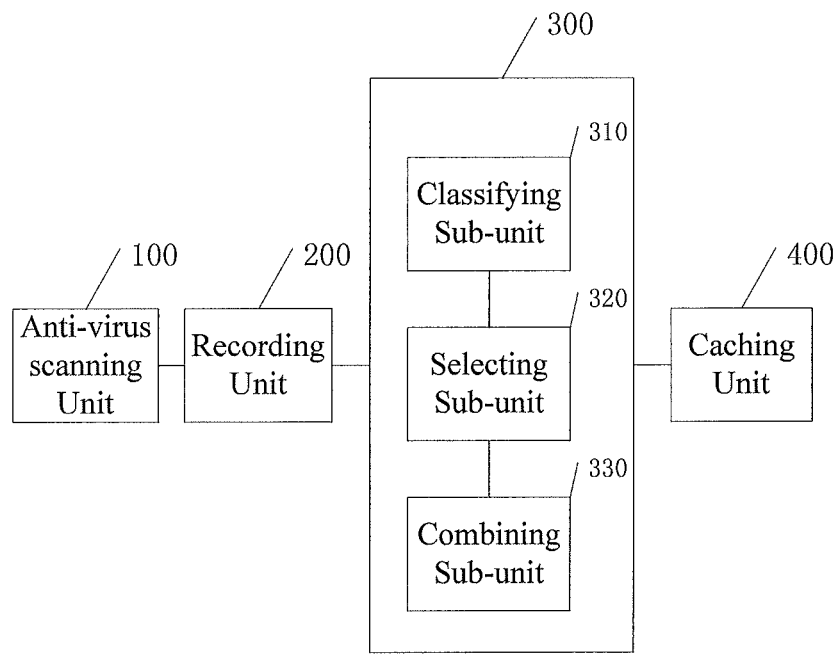
FIG. 6 is a structure diagram of a device for anti-virus scanning according to yet another embodiment of the invention.

Referring to FIG. 6, it is a structure diagram of a device for anti-virus scanning according to yet another embodiment of the invention. The device comprises: an anti-virus scanning unit 100, a recording unit 200, a processing unit 300 and a caching unit 400.

The processing unit 300 comprises: a classifying sub-unit 310, a selecting sub-unit 320, a combining sub-unit 330.

The classifying sub-unit 310 is configured to classify all files according to their file types; the selecting sub-unit 320 is configured to for files with different types, select cache files according to at least one of file popularity, a reading attributes of anti-virus engine, and unhitted cache data reported by a terminal; the combining sub-unit 330 is configured to combine disk sections having read/write operations corresponding to the cache files to obtain a cache reference section, wherein, the file popularity is high if the file is frequently used, and the file popularity is low if the file is rarely used. The reading attributes of anti-virus engine may be frequencies of the anti-virus engine reading respective sections of the disk.

Figure 7:
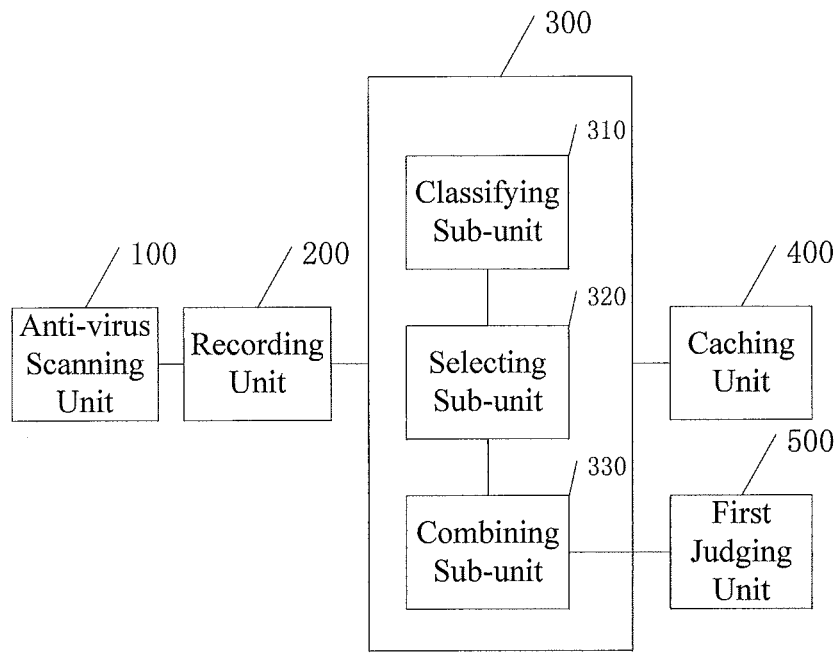
FIG. 7 is a structure diagram of a device for anti-virus scanning according to yet another embodiment of the invention.

Referring to FIG. 7, it is a structure diagram of a device for anti-virus scanning according to yet another embodiment of the invention. The device comprises: a anti-virus scanning unit 100, a recording unit 200, a processing unit 300, a caching unit 400 and a first judging unit 500.

The first judging unit 500 is configured to judge whether a file capacity in the cache reference section exceeds a preset threshold, after the combining sub-unit 330 combines disk sections having read/write operations corresponding to the cache files to obtain a cache reference section. If the file capacity exceeds the preset threshold, then it indicates the anti-virus scanning unit 100 to perform an anti-virus scan operation on at least one file in the cache reference section, indicates the recording unit 200 to record information of the at least one file and information of a disk section having a read/write operation during an anti-virus scan operation on the at least one file, and indicates the processing unit 300 to analyze the information of the at least one file and the information of the disk section having the read/write operation during an anti-virus scan operation on the at least one file, until the file capacity in the cache reference section meets the requirement of the preset threshold.

Figure 8:
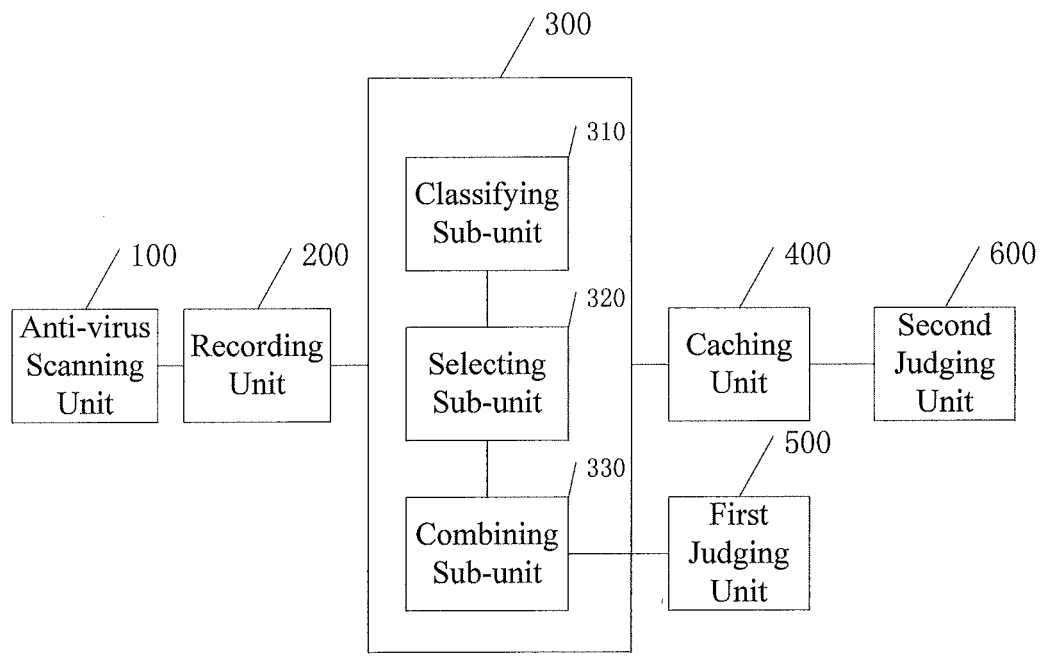
FIG. 8 is a structure diagram of a device for anti-virus scanning according to yet another embodiment of the invention.

Referring to FIG. 8, it is a structure diagram of a device for anti-virus scanning according to yet another embodiment of the invention. The device comprises: an anti-virus scanning unit 100, a recording unit 200, a processing unit 300, a caching unit 400, a first judging unit 500, and a second judging unit 600.

The second judging unit 600 is configured to load one or more files in the cache reference section into the memory, and judge whether there exists a to-be-scanned file in the memory when the anti-virus scanning unit 100 receives an anti-virus scan request. If there exists no to-be-scanned files, then it indicates the anti-virus scanning unit 100 to directly read the to-be-scanned file from a disk to scan, indicates the recording unit 200 to record information of the to-be-scanned file and information of a disk section having a read/write operation during the scan on the to-be-scanned file, and indicates the processing unit 300 to combine the disk section having the read/write operation during the scan on the to-be-scanned file into the cache reference section.

It should be noted that various embodiments herein may be described in a progressive manner. One embodiment may be described by emphasizing its difference from other embodiments. For similar/same things between one embodiment and another embodiment, one may refer to the another embodiment. Exemplary embodiments of device may be described briefly here since exemplary embodiments of devices are similar with exemplary embodiments of methods, and for relative things between them, one may refer to the illustrations in the exemplary embodiments of methods.

Based on the above description of embodiments, exemplary embodiments of the present invention may have the following benefits.

A cache reference section is obtained by recording and analyzing information of at least one file and information of a disk section having a read/write operation during anti-virus scan operation on the at least one file. So, when scanning next time, the at least one file in the cache reference section can be pre-loaded into a memory. Thus, cache data can be identified, and the efficiency of anti-virus scanning can be improved. By classifying the files to select proper cache files according to file popularity, a reading attributes of anti-virus engine, and unhitted cache data reported by a terminal, the range of cache reference section can be compressed, and the hit rate of cache files can be raised. Moreover, by judging whether the file capacity of cache reference section is appropriate so as to compress the cache reference section repeatedly, the memory storage pressure can be reduced, and the efficiency of anti-virus scanning can be increased without affecting the process performance. When a cache file is unhitted, the section corresponding to the unhitted cache file may be combined into the cache reference section. Therefore, the cache reference section can be further improved, and the hit rate of cache files can be enhanced.

A person having ordinary skills in the art can realize that part or whole of the processes in the methods according to the above embodiments may be implemented by a computer program instructing relevant hardware. The program may be stored in a computer readable storage medium. When executed, the program may execute processes in the above-mentioned embodiments of methods. The storage medium may be a magnetic disk, an optical disk, a Read-Only Memory (ROM), a Random Access Memory (RAM), et al.

The above descriptions are some exemplary embodiments of the invention, and should not be regarded as limitation to the scope of related claims. A person having ordinary skills in a relevant technical field will be able to make improvements and modifications within the spirit of the principle of the invention. The improvements and modifications should also be incorporated in the scope of the claims attached below.

What is claimed is:

1. A method for anti-virus scanning, comprising:
recording, when performing an anti-virus scan operation on at least one file in a disk, information of the at least one file and recording information of a disk section having a read/write operation during the anti-virus scan operation;
analyzing the information of the at least one file and the information of the disk section having the read/write operation, and obtaining a cache reference section;
loading one or more files in the cache reference section into a memory, and reading the loaded one or more files in the memory to scan when receiving an anti-virus scan request.

2. The method of claim 1, wherein information of each of the at least one file comprises:
a file type, and a hash data of the file, wherein:
the file type is used to classify files and perform statistic on disk sections having read/write operations for files of respective types; and
the hash data of the file is used to check correction and integration of the file.

3. The method of claim 2, wherein analyzing the information of the at least one file and the information of the disk section having the read/write operation during the anti-virus scan operation, and obtaining a cache reference section, comprises:
classifying all files according to their file types;
for files with different types, selecting cache files according to at least one of file popularity, a reading attribute of anti-virus engine, and unhitted cache data reported by a terminal; and
combining disk sections having read/write operations corresponding to the cache files to obtain the cache reference section,
wherein, the file popularity is high when the file is frequently used, and the file popularity is low when the file is rarely used; and the reading attribute of anti-virus engine is frequencies of an anti-virus engine reading respective sections of the disk.

4. The method of claim 3, after combining the disk sections having the read/write operations corresponding to the cache files to obtain the cache reference section, further comprising:
judging whether a file capacity in the cache reference section exceeds a preset threshold; and
if the file capacity exceeds the preset threshold, performing an anti-virus scan operation on files in the cache reference section, recording information of the files and information of disk sections having read/write operations during the anti-virus scan operation, analyzing the information of the files and the information of the disk sections having the read/write operations during the anti-virus scan operation, until the file capacity in the cache reference section meets the requirement of the preset threshold.

5. The method of claim 1, wherein the step of loading one or more files in the cache reference section into a memory and reading the loaded one or more files in the memory to scan when receiving the anti-virus scan request, comprises:

loading one or more files in the cache reference section into the memory, and judging whether there exists a to-be-scanned file in the memory when receiving the anti-virus scan request; and if there exists no to-be-scanned file, reading the to-be-scanned file directly from the disk to scan, recording information of the to-be-scanned file and information of a disk section having a read/write operation during the scan on the to-be-scanned file, and combining the disk section having the read/write operation during the scan on the to-be-scanned file into the cache reference section.

6. The method of claim 2, wherein the step of loading one or more files in the cache reference section into a memory and reading the loaded one or more files in the memory to scan when receiving the anti-virus scan request, comprises:

loading one or more files in the cache reference section into the memory, and judging whether there exists a to-be-scanned file in the memory when receiving the anti-virus scan request; and if there exists no to-be-scanned file, reading the to-be-scanned file directly from the disk to scan, recording information of the to-be-scanned file and information of a disk section having a read/write operation during the scan on the to-be-scanned file, and combining the disk section having the read/write operation during the scan on the to-be-scanned file into the cache reference section.

7. The method of claim 3, wherein the step of loading one or more files in the cache reference section into a memory and reading the loaded one or more files in the memory to scan when receiving the anti-virus scan request, comprises:

loading one or more files in the cache reference section into the memory, and judging whether there exists a to-be-scanned file in the memory when receiving the anti-virus scan request; and if there exists no to-be-scanned file, reading the to-be-scanned file directly from the disk to scan, recording information of the to-be-scanned file and information of a disk section having a read/write operation during the scan on the to-be-scanned file, and combining the disk section having the read/write operation during the scan on the to-be-scanned file into the cache reference section.

8. The method of claim 4, wherein the step of loading one or more files in the cache reference section into a memory and reading the loaded one or more files in the memory to scan when receiving the anti-virus scan request, comprises:

loading one or more files in the cache reference section into the memory, and judging whether there exists a to-be-scanned file in the memory when receiving the anti-virus scan request; and if there exists no to-be-scanned file, reading the to-be-scanned file directly from the disk to scan, recording information of the to-be-scanned file and information of a disk section having a read/write operation during the scan on the to-be-scanned file, and combining the disk section having the read/write operation during the scan on the to-be-scanned file into the cache reference section.

9. A device for anti-virus scanning, comprising:
a memory storing a plurality of program codes; and
a processor configured to execute the plurality of program codes for
performing an anti-virus scan operation on at least one file in a disk;

recording, when performing an anti-virus scan operation on at least one file in a disk, information of the at least one file and recording information of a disk section having a read/write operation during the anti-virus scan operation;

analyzing the information of the at least one file and the information of the disk section having the read/write operation and obtain a cache reference section;

loading one or more files in the cache reference section into a memory, and indicate the anti-virus scanning unit to read the loaded one or more files from the memory to scan when the anti-virus scanning unit receives an anti-virus scan request.

10. The device of claim 9, wherein information of each of the at least one file comprises:
a file type, and a hash data of the file, wherein:
the file type is used to classify files and perform statistic on disk sections having read/write operations for files of respective types; and
the hash data of the file is used to check correction and integration of the file.

11. The device of claim 10, wherein the program codes for analyzing the information of the at least one file and the information of the disk section having the read/write operation and obtain a cache reference section are executed for:
classifying all files according to their file types;
for files with different types, selecting cache files according to at least one of file popularity, a reading attribute of anti-virus engine, and unhitted cache data reported by a terminal;
combining disk sections having read/write operations corresponding to the cache files to obtain a cache reference section,
wherein, the file popularity is high when the file is frequently used, and the file popularity is low when the file is rarely used; and the reading attribute of anti-virus engine is frequencies of an anti-virus engine reading respective sections of a disk.

12. The device of claim 11, after the program codes are executed for combining the disk sections having the read/write operations corresponding to the cache files to obtain the cache reference section, the program codes are further executed for:
judging whether a file capacity in the cache reference section exceeds a preset threshold after the combining subunit combines disk sections having read/write operations corresponding to cache files to obtain a cache reference section, wherein
if the file capacity exceeds the preset threshold, the program codes are executed to perform an anti-virus scan operation on files in the cache reference section, to record information of the files and information of disk sections having a read/write operation during an anti-virus scan operation on the files, and to analyze the information of the files and the information of the disk sections having the read/write operation during an anti-virus scan operation on the files until the file capacity in the cache reference section meets the requirement of the preset threshold.

13. The device of claim 9, wherein the program codes are further executed for:
loading one or more files in the cache reference section into the memory, and judging whether there exists a to-be-scanned file in the memory when the anti-virus scanning unit receives an anti-virus scan request, wherein
if there exists no to-be-scanned file, the program codes are executed for directly reading the to-be-scanned file from a disk to scan, recording information of the to-be-scanned file and information of a disk section having a read/write operation during the scan on the to-be-scanned file, and combining the disk section having the read/write operation during the scan on the to-be-scanned file into the cache reference section.

14. The device of claim 10, wherein the program codes are further executed for:
  loading one or more files in the cache reference section into the memory, and judging whether there exists a to-be-scanned file in the memory when the anti-virus scanning unit receives an anti-virus scan request, wherein
  if there exists no to-be-scanned file, the program codes are executed for directly reading the to-be-scanned file from a disk to scan, recording information of the to-be-scanned file and information of a disk section having a read/write operation during the scan on the to-be-scanned file, and combining the disk section having the read/write operation during the scan on the to-be-scanned file into the cache reference section.

15. The device of claim 11, wherein the program codes are further executed for:
  loading one or more files in the cache reference section into the memory, and judging whether there exists a to-be-scanned file in the memory when the anti-virus scanning unit receives an anti-virus scan request, wherein
  if there exists no to-be-scanned file, the program codes are executed for directly reading the to-be-scanned file from a disk to scan, recording information of the to-be-scanned file and information of a disk section having a read/write operation during the scan on the to-be-scanned file, and combining the disk section having the read/write operation during the scan on the to-be-scanned file into the cache reference section.

16. The device of claim 12, wherein the program codes are further executed for:
  loading one or more files in the cache reference section into the memory, and judging whether there exists a to-be-scanned file in the memory when the anti-virus scanning unit receives an anti-virus scan request,
  if there exists no to-be-scanned file, the program codes are executed for directly reading the to-be-scanned file from a disk to scan, recording information of the to-be-scanned file and information of a disk section having a read/write operation during the scan on the to-be-scanned file, and combining the disk section having the read/write operation during the scan on the to-be-scanned file into the cache reference section.

\* \* \* \* \*